June 29, 1954  K. SCHWENK  2,682,149
HYDRAULIC MASTER CYLINDER
Filed May 16, 1950

INVENTOR
Kurt Schwenk

BY Richards & Geier
ATTORNEYS

Patented June 29, 1954

2,682,149

UNITED STATES PATENT OFFICE 2,682,149

HYDRAULIC MASTER CYLINDER

Kurt Schwenk, Ingolstadt, Germany

Application May 16, 1950, Serial No. 162,181

4 Claims. (Cl. 60—54.6)

This invention relates to hydraulic brakes for automobiles and the like, and is particularly concerned with the master cylinders of such brakes.

In prior art in hydraulic brakes of the type used in automobiles and the like the increase in pressure in the conduits leading to the wheel brake cylinders is produced by a so-called main piston which is located in the master cylinder. In order to prevent air from penetrating into the fluid system a certain amount of pressure must prevail therein, which, heretofore, was attained by the use of valves located at the end of the master cylinder.

A drawback of this construction is that only the conduit leading to the wheel brake remains under pressure and the valve can be easily rendered inoperative as a result of impurities in the hydraulic brakes, or for other reasons. If the supply of hydraulic fluid is maintained by a reservoir the pressure chambers thereof require an additional, complicated valve device with the result that the construction of the master cylinder becomes extremely complicated.

An object of this invention is to eliminate these drawbacks and to produce a comparatively simple and effectively operating main hydraulic brake, particularly the master cylinder section thereof.

Other objects of the present invention will become apparent in the course of the following specification.

In accordance with the present invention a master cylinder for hydraulic brakes for automobiles or the like is provided wherein pressure is maintained in the conduit leading to the brake wheel cylinder when the brake is inoperative, and wherein a second piston is provided between the brake pedal and the brake wheel cylinder.

In accordance with the present invention this second piston produces the continuous fluid pressure and is located in a chamber of the master cylinder which is subjected to an increase in pressure during the braking operation. Due to this construction there is no valve necessary between the conduit and the master cylinder so that this connection is not interfered with.

An important advantage of this construction is the elimination of the separate constant pressure container with its additional valves.

While prior art master cylinders—for example, so-called, two-circuit brakes—operate with two pistons, in accordance with the present construction, the second piston does not participate in the braking operation and is merely shifted to and fro with the hydraulic fluid without consuming any additional power so long as the brake operates properly.

A further particular advantage of the device constructed in accordance with the present invention is that by placing the auxiliary piston, which creates the steady pressure, in the master cylinder between the main piston and the braking conduit, the reservoir is separated from the main piston only for short intervals so that in the event of an excessive leakage in the braking conduit, which cannot be compensated by the auxiliary piston, the main piston continues to remain operative (thereby assuring the operation of the brake) so long as there is any hydraulic fluid in the reservoir.

A further important improvement in the present invention consists in that the auxiliary piston, which is subjected to spring pressure, withdraws fluid from the reservoir when steady pressure drops unexpectedly.

As compared to prior art devices wherein liquid must be sucked into a special chamber during each reciprocation of the piston, in accordance with the present invention this operation takes place only when, through leakage or contraction of fluid as the result of excessive cooling, an excessive drop in pressure has taken place in the brake conduit.

In accordance with the present invention, the path of the spring-engaged piston is limited by a stop, and in the end position a sealing sleeve connected with the piston begins to act as an overflow valve to provide a flow in the direction toward the brake conduit. As a result of this arrangement losses by reason of leakage are compensated during effective braking since liquid flows in front of the spring-engaged piston.

Furthermore, in accordance with the construction of the present invention, when unexpected increase in pressure takes place in the brake conduit, the spring-engaged piston is shifted to a predetermined extent in the direction of the main piston, and in that position the construction has a valve effect permitting fluid to flow from the front side of the piston into spaces wherein lower pressure prevails. This arrangement effectively prevents an undesired operation of the brakes, which could otherwise take place in the event the braking fluid was excessively expanded by heat in the brake conduit, and an excessive increase in the pressure has taken place. In accordance with the present invention, this valve-like action of the auxiliary piston in the predetermined position is caused by a recess provided in the cylinder wall, or by a projection which removes the sealing sleeve of the piston from its sealing position.

The invention will appear more clearly from the following detailed description, when taken in connection with the accompanying drawing, showing, by way of example, preferred embodiments of the inventive idea.

Figure 1:
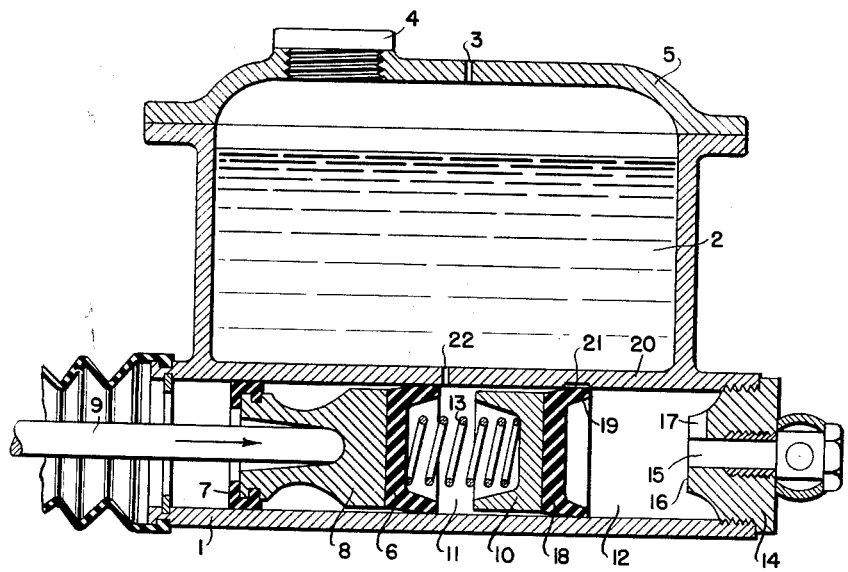
Figure 1 is a longitudinal section through the master cylinder of a hydraulic brake.

Figure 1 shows a master cylinder 1 having a smooth, continuous bore, and combined with a reservoir 2. The reservoir 2 has a top portion 5 provided with an air vent 3, and a cover 4, which is screwed into a threaded opening provided in the top 5.

A main piston 8 is located in the master cylinder 1 and is provided with a front sealing member 6 and a rear sealing member 7. A piston rod 9 is connected to the main piston 8, and is also connected by a leverage system which is not shown in the drawings, with the usual brake pedal of an automobile.

A second piston 10 is located in the main cylinder 1. A chamber 11 separates the second piston 10 from the main piston 8. A space or chamber 12 separates the piston 10 from a stop 16. A helical spring 13 is located in the chamber 11, and presses against the second piston 10, and engages the sealing member 6 carried by the main piston 8. The spring 13 exerts continuous pressure against the second piston 10 in the direction of the stop 16. The stop 16 is carried by a closure member 14, which is screwed into a threaded end of the master cylinder 1, and which is provided with a passage 15 leading to the brake conduit.

The brake conduit leads to the wheel brake cylinder, which is not shown in the drawing. The stop 16 has an upper recess 17 which engages the sealing member 18 carried by the second piston 10. The member 18 is located upon the front surface of the piston 10, and has a flange 19 which is comparatively thin and easily yieldable to pressure. It is apparent that the sealing member 18 maintains proper engagement of the piston 10 with the walls of the cylinder 1 since the body of the piston 10 has substantial play in relation to the cylinder walls, and this play constitutes a passage for the fluid which is further facilitated by the recess 21 provided in the cylinder 1.

An opening 22 provided in the wall 20 of the cylinder 1 connects the reservoir 2 with the space 11 located in front of the main piston 8, and behind the second piston 10.

This device operates as follows:

When the fluid system is filled with the brake fluid and in the operative position of the main piston 8, which is shown in the drawing, the sealing member 6 is clear of the opening 22 so that the hydraulic fluid in the reservoir 2 is connected with the cylinder chamber 11.

The flange 19 of the sealing member 18 covers the recess 21 so that the chamber 12 in the main cylinder is separated from the chamber 11. On the other hand, the spring 13 exerts pressure on the piston 10 which is connected with the sealing member 18 so that the piston 10 manitains pressure in the chamber 12, the passage 15 and the brake conduit connected with the passage 15, thereby preventing the penetration of air into this part of the brake system.

When the main piston 8 is moved in the direction of the arrow shown in Figure 1, that is, when a braking action takes place, the sealing member 6 will cover the opening 22 and thereby separate the reservoir 2 from the chamber 11. Since the fluid contained in the chamber 11 is not compressible the second piston 10 will move along with the piston 8 so that pressure in the chamber 12 will be increased, and this increased pressure will be transmitted through the passage 15 and conduit to the brake and will produce the braking operation.

Should, as a result of leakage in the brake conduit, a substantial drop in pressure take place in the chamber 12 while the brake is inoperative, then the second piston 10 will be pressed by the spring 13 in the direction of the stop 16, and this movement of the piston 10 will continue until the required constant pressure is re-established in the chamber 12.

In the event the drop in pressure continues as a result of leakage, the second piston 10 will move until the front side of the sealing member 18 strikes the stop 16. If pressure in the chamber 11 continues to increase the flange 19 of the member 18 will be easily moved away from the walls of the cylinder 1 in this position, and then the fluid located in the chamber 11 will be able to flow through the recess 17 provided in the stop 16 and into the passage 15 and brake conduit until pressure balance is re-established.

On the other hand, if an undesired increase in pressure takes place in the chamber 12, which may be caused, by way of example, through excessive heating of the fluid in the brake conduit, and the resultant expansion of the fluid, then the second piston 10 is moved back by this increase in pressure until the flange 19 clears the recess 21. Then the fluid located in the chamber 12 can flow through the recess 21 and the passages between the piston 10 and the cylinder 1 into the chamber 11 until pressure balance is re-established.

Figure 2:
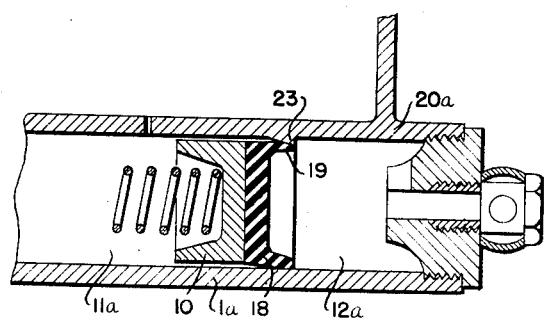
Figure 2 is a partial longitudinal section, illustrating a different embodiment of the inventive idea.

Figure 2 illustrates a construction wherein the master cylinder 1a has a wall 20a which is provided with a projection 23. This projection 23 is adapted to engage the flange 19 of the sealing member 18, thereby voiding the sealing action of the member 18 and establishing a connection between the chambers 12a and 11a. It is apparent that the projection 23 will raise the overlying part of the flange 19 off the wall of the cylinder 1a. Thus, the action of the projection 23 is the same as that of the recess 21, in the construction shown in Figure 1. In other respects the construction of Figure 2 is the same as that of Figure 1.

It is apparent that the examples shown above have been described solely by way of illustration and not by way of limitation, and that they are subject to many variations and modifications without departing from the scope or intent of the present invention. All such variations and modifications are to be included within the scope of the present invention.

What is claimed is:

1. In a hydraulic braking system for automobiles and the like, in combination with a brake conduit; a master cylinder having one end connected with said brake conduit, a main piston located within said cylinder at the other end thereof, a second piston located in said cylinder between said main piston and said brake conduit, a spring located between said pistons and pressing against said second piston, said second piston being spaced from the wall of said cylinder, a stop at the first-mentioned end of said cylinder, and a sealing member carried by said second piston and pressing against the wall of the cylinder, the wall of said cylinder having means spacing said sealing member from said wall in a predetermined position of the sealing member to establish fluid communication between said brake conduit and the space between the pistons.

2. In a hydraulic braking system for automobiles and the like, in combination with a brake conduit; a master cylinder having one end connected with said brake conduit, a main piston located within said cylinder at the other end thereof, a second piston located in said cylinder between said main piston and said brake conduit, a spring located between said pistons and pressing against said second piston, the wall of said cylinder having a recess formed therein and establishing fluid communication between said brake conduit and the space between the pistons in a predetermined position of the second piston.

3. In a hydraulic braking system for automobiles and the like, in combination with a brake conduit; a master cylinder having one end connected with said brake conduit, a main piston located within said cylinder at the other end thereof, a second piston located in said cylinder between said main piston and said brake conduit, a spring located between said pistons and pressing against said second piston, said second piston being spaced from the wall of said cylinder, and a sealing member carried by said second piston and pressing against the wall of the cylinder, the wall of said cylinder having a recess formed therein and establishing fluid communication between said brake conduit and the space between the pistons in a predetermined position of the sealing member.

4. In a hydraulic braking system for automobiles and the like, in combination with a brake conduit; a master cylinder having one end connected with said brake conduit, a main piston located within said cylinder at the other end thereof, a second piston located in said cylinder between said main piston and said brake conduit, a spring located between said pistons and pressing against said second piston, said second piston being spaced from the wall of said cylinder, and a sealing member carried by said second piston and pressing against the wall of said cylinder, and a projection extending from the wall of said cylinder adapted to engage said sealing member to move it away from the wall to establish fluid communication between said brake conduit and the space between the pistons.

References Cited in the file of this patent

UNITED STATES PATENTS

| Number | Name | Date |
|---|---|---|
| 1,847,402 | Loughhead | Mar. 1, 1932 |
| 2,136,835 | Begg | Nov. 15, 1938 |
| 2,240,792 | Liebreich | May 6, 1941 |

FOREIGN PATENTS

| Number | Country | Date |
|---|---|---|
| 365,069 | Great Britain | Jan. 6, 1932 |
| 389,930 | Great Britain | Mar. 30, 1933 |